Oct. 7, 1941.                F. GRAY                    2,257,795
              ELECTRON DISCHARGE APPARATUS AND CIRCUITS
                  Filed May 27, 1939        6 Sheets-Sheet 1

INVENTOR
F. GRAY
BY
ATTORNEY

Oct. 7, 1941.  F. GRAY  2,257,795
ELECTRON DISCHARGE APPARATUS AND CIRCUITS
Filed May 27, 1939  6 Sheets-Sheet 2

INVENTOR
F. GRAY
BY
*H. A. Burgess*
ATTORNEY

Oct. 7, 1941. F. GRAY 2,257,795
ELECTRON DISCHARGE APPARATUS AND CIRCUITS
Filed May 27, 1939 6 Sheets-Sheet 3

INVENTOR
F. GRAY
BY
H. A. Burgess
ATTORNEY

Oct. 7, 1941.  F. GRAY  2,257,795
ELECTRON DISCHARGE APPARATUS AND CIRCUITS
Filed May 27, 1939  6 Sheets-Sheet 4

INVENTOR
F. GRAY
BY
ATTORNEY

Oct. 7, 1941.   F. GRAY   2,257,795
ELECTRON DISCHARGE APPARATUS AND CIRCUITS
Filed May 27, 1939   6 Sheets-Sheet 5

INVENTOR
F. GRAY
BY
H. A. Burgess
ATTORNEY

Oct. 7, 1941.  F. GRAY  2,257,795

ELECTRON DISCHARGE APPARATUS AND CIRCUITS

Filed May 27, 1939  6 Sheets-Sheet 6

INVENTOR
F. GRAY
BY
*J. A. Burgess*
ATTORNEY

Patented Oct. 7, 1941

2,257,795

UNITED STATES PATENT OFFICE 2,257,795

ELECTRON DISCHARGE APPARATUS AND CIRCUITS

Frank Gray, New York, N. Y., assignor to Bell Telephone Laboratories, Incorporated, New York, N. Y., a corporation of New York Application May 27, 1939, Serial No. 276,044

4 Claims. (Cl. 179—15)

The present invention relates to electrical wave shaping or wave control for such purposes as signal transmission or signal reception.

A particular object of the invention is to adapt electric discharge devices of the cathode beam type to serve as effective electrical wave controllers for these and kindred purposes.

A method heretofore proposed for producing a modulated wave is to interrupt a signal wave at a high frequency. With abrupt chopping in this manner it is found that modulation of a wave of the interruption frequency and of waves representing its harmonics results. Thus, a succession of pairs of side-bands is produced based upon "carriers" of frequencies $f_0$, $2f_0$, $3f_0$, etc. where $f_0$ is the interruption frequency. One instance of modulation by this method is given in U. S. patent to W. R. Bennett, No. 2,213,938, issued September 3, 1940.

It has also been proposed heretofore to use a cathode beam tube for producing rapid interruption of a signal wave as by varying the intensity of the beam in accordance with the signal and producing movement of the beam across an anode or a target at a high frequency.

I have discovered that the cathode beam type of discharge device affords a very effective means of controlling waves to secure desired types of output products. My present invention is concerned with methods and structures using cathode beam tubes whereby desirable types of wave control are achieved, principally in translating from one frequency range to another for purposes of intelligence transmission.

I have found, in accordance with this invention, that the character of the output products can be varied within wide limits and can be accurately predetermined by suitable control of such variables as the cross-section of the beam in relation to the shape of the target or targets and the manner of control of the beam. I have found that the output products can be restricted to particular frequency regions and the device thus made to serve a filtering function, as well as a frequency-translating function. Certain forms, in accordance with the invention, operate as two-way transducers offering a simplification of two-way carrier terminal apparatus. These and various other modifications will be set forth in detail in the description to follow, in conjunction with the drawings.

First, the electron-beam tube of Fig. 1 will be described as one example of structure according to the invention and then various modifications and their modes of operation according to the invention will be disclosed by way of illustration.

Figure 1:
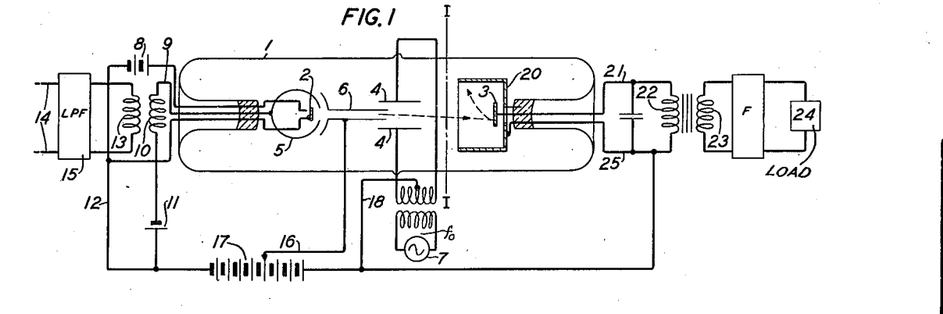
Fig. 1 is a diagrammatic view, partly in section, of a beam tube and circuit therefor in accordance with one form of the invention.
Figure 1A:
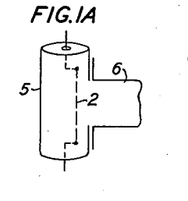
Fig. 1A shows a detail of the construction of the cathode and beam forming elements.
Figure 1B:
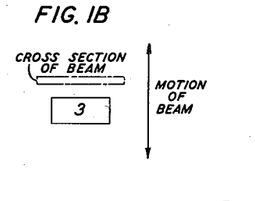
Fig. 1B shows the shape of beam and its motion.

In Fig. 1 the tube 1 comprises an elongated cylindrical envelope having a cathode 2 at one end and an anode or target 3 at the other end, and having deflecting plates 4 suitably placed at an intermediate point. In this case the target 3 is rectangular with its longer dimension perpendicular to the plane of the paper and the type of beam desired is wide and thin in cross-section, widest in the direction perpendicular to the paper. (See Fig. 1B.) The cathode, grid and focussing structure are designed accordingly. The cathode 2 is elongated, e. g., filamentary, and entirely surrounded by the "grid" or control electrode 5 except for a slot on the side toward the anode. (Fig. 1A.) This slot is aligned with the focussing tube 6 which is wide in comparison with its height. The deflector plates 4 move the beam up or down in the figure under control of applied voltage from source 7.

The cathode is heated by means of leads brought out through the press to terminals of battery 8. Control voltages are impressed on the grid 5 over a lead 9 extending to upper end of secondary winding 10, the lower end of which connects through grid bias battery 11 to one side of the cathode via lead 12. The grid is thus given a negative bias voltage. The control voltages applied to the grid are shown as impressed on primary winding 13 connected to a signal input circuit 14 which in the case of speech preferably has a low-pass filter 15 included for limiting the band of applied frequencies to some definite range such as the range below 3,000 cycles. The potential of focussing anode 6 is fixed by a connection 16 to a suitable point in anode battery 17 and the reference potential of deflector plates 4 is fixed by connection 18 to the positive pole of battery 17.

Anode 3 is surrounded by collector ring 20 for collecting secondary electrons emitted from the anode. Leads from members 3 and 20 are brought out through the press and connected to positive pole of battery 17, lead 21 connecting to the upper end of output primary winding 22, the secondary 23 of which is connected to any suitable output or load 24.

When the beam strikes the target 3 is drives out secondaries which are attracted over to the collector ring 20 because of the higher positive potential present on 20, this different of potential being equal to the drop of potential across winding 22. If desired, some extra battery cells could be included in the lead 25 to the ring 20 to give any desired differential voltage. The electrons collected at 20 are returned over lead 25 to battery 17. The result of the beam striking the target is therefore a net electron current flow away from the target so that an impulse flows upward through coil 22 considering the direction of electron flow. The tube could be used in the same way without the ring 20 in which case the electrons incident upon the target 3 would flow downward through winding 22 to battery 17. The use of secondaries permits a higher output current to be obtained and is considered preferable.

Figure 2:
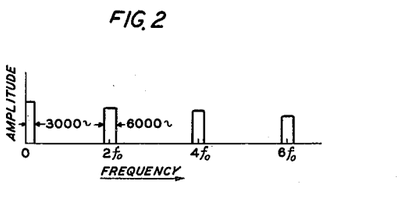
Fig. 2 is a diagram indicating the frequency ranges involved in the operation of the tube and circuit of Fig. 1.

If the beam is oscillated at some high frequency from source 7 and if speech is applied to the grid, the strength of the electron beam is varied as a function of the speech wave and this wave is sampled at high frequency as the beam oscillates over the target 3. The action is similar to taking small fragments of a speech wave at a high frequency. A sampling occurs with each direction of swing past the target so that modulation of twice the frequency of the wave from source 7, together with its harmonics results. This is indicated in the frequency diagram given in Fig. 2. The speech band extending from 0 to 3,000 cycles is indicated together with the bands each 6,000 cycles wide centered about the frequencies $2f_0$, $4f_0$ and $6f_0$ etc., where $f_0$ is the frequency of the wave from source 7. Theoretically there is an infinite number of such modulation bands extending to higher and higher frequencies and in general diminishing in amplitude.

The device of Fig. 1 can also be used to demodulate an incoming modulated wave at 14, 15, 13 by providing such a frequency and phase relation between the received waves and the locally generated wave at 7 as to cause rectification of the received modulated wave. The incoming waves will be rectified if the beam is caused to traverse the target only at instants when the incoming wave has the same polarity and is off the target at all other times, or approximately this condition obtains. Since the beam traverses the target twice in each period of the locally supplied wave, it suffices for this wave to have a frequency one-half that of the incoming carrier wave. With proper phase and amplitude of beam swing, each transit of the beam across the target will occur in, let us say, the time corresponding to a positive lobe of the received modulated wave, and rectification and demodulation will take place. In this use it will be understood that the filter 15 may be removed from circuit 14, and if desired, placed in circuit between 23 and 24.

Figure 3:
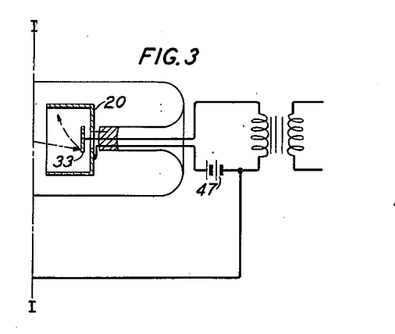
Fig. 3 shows a modification of the portion of the Fig. 1 construction to the right of broken line I—I.
Figure 3A:
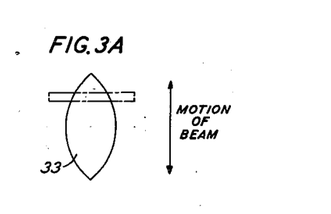
Figs. 3A and 3B show shapes of target suitable for the Fig. 3 construction.
Figure 3B:
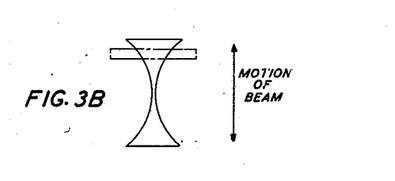
Figure 4:
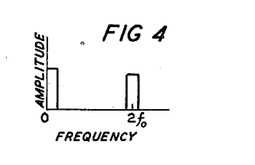
Fig. 4 shows the frequency characteristic applicable to the Fig. 3 construction.

With the apparatus and circuit of Fig. 1, the interruption of the beam at the target is abrupt, giving an output wave that has sharp corners and steep sides. Such a wave is rich in harmonics. (See Fig. 2). By means of a different shaping of the beam and target in relation to each other, the output current may be made sinusoidal or nearly so with constant beam intensity and will be free of harmonics. Such an arrangement is shown in Figs. 3, 3A and 3B. Fig. 3 is intended in this modification to replace the portion of Fig. 1 to the right of broken line I—I. The target has curved edges and its longest dimension is in the vertical direction, one shape which it may take being generally as indicated in Fig. 3A. The beam may have such an amplitude as never to reach either point or it may travel to extreme positions where the output current just reaches zero but is not actually interrupted for any interval. Another form of target giving similar results is shown in Fig. 3B. In this case the beam travel must not extend far enough to produce interruption especially since the current is a maximum at the extreme positions on the target. When the beam intensity is controlled by the input signal, modulation is produced of the frequency $2f_0$ as indicated in Fig. 4. Absence of harmonics of the sweep frequency $(2f_0)$ results in the production of only the two side-bands based upon the frequency $2f_0$. If $x$ is the displacement of the beam from the center of the target and $y$ is half the width of the target at whatever point $x$ is taken, the surface of the target shown in Fig. 3A is defined by $y=a-bx^2$, and of the target shown in Fig. 3B by $y=ax^2$, where $a$ and $b$ are constants of proportionality.

That the structure of Fig. 3 with either the target of Fig. 3A or that of Fig. 3B will also demodulate an incoming modulated wave with the aid of a locally supplied wave from source 7 of frequency $f_0$ and of proper phase can be seen as follows. If there were no oscillation of the beam from its mid-position in the case of the Fig. 3A target or from some suitable displaced position in the case of the Fig. 3B target the incoming modulated wave would simply be repeated into the output circuit without frequency shift. The incoming modulated wave is a wave of frequency $2f_0$ growing and diminishing in amplitude at the signal frequency. If, now, the beam is so oscillated that it moves from a narrow to a wide portion of the target during a particular quarter period of the incoming wave in which the intensity of the beam is changing from average to minimum, absolute value, the effect of such movement is to counteract the effect on the output current of the decreasing intensity of the beam. In the next quarter period of the incoming wave the intensity is increasing but the continued movement of the beam is from wide to narrow portions of the target so that again the effects are opposing. In the next two quarter periods, however, the intensity changes in the beam augment the effects of the beam movements across the target. Thus half periods of the incoming wave of the same polarity are retained and reinforced while the opposite half waves are diminished or cancelled.

Figures 5, 5A, 5B, 6, 7, 7A:
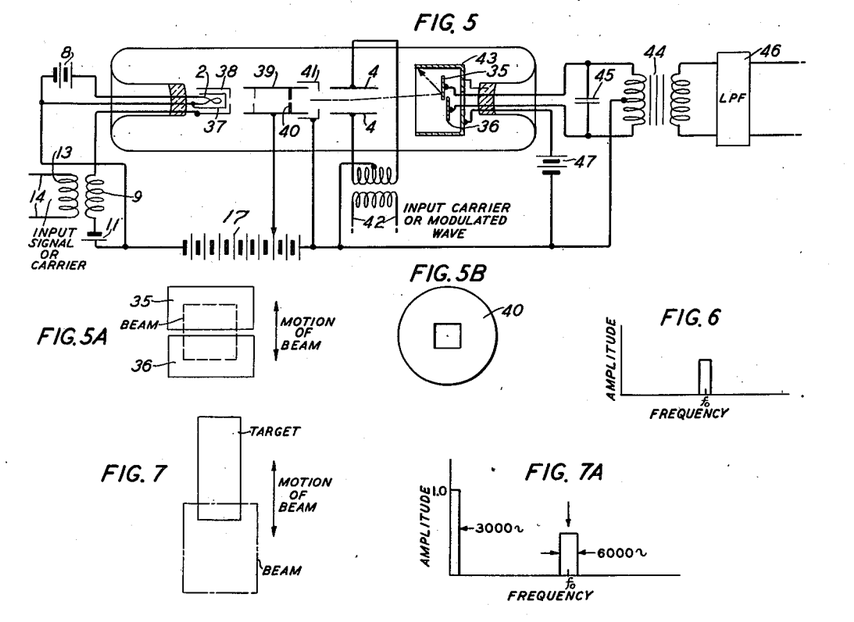
Fig. 5 is a view, generally similar to Fig. 1, of another type of tube and circuit according to the invention.
Figs. 5A and 5B show details of Fig. 5.
Fig. 6 shows the corresponding frequency diagram.
Figs. 7, 8 and 9 show alternative beam and target shapes.
Figs. 7A, 8A and 9A show the corresponding frequency diagrams.

Fig. 5 shows a tube construction in which use is made of a split target, the two portions being shown at 35 and 36. The beam in this case preferably has a square cross-section and is normally half on each portion of the target as indicated in Fig. 5A. To prevent a gap between adjacent edges of the two halves of the target one-half may be placed back of the other with a slight overlap as in Fig. 5. The beam is oscillated upward and downward in Fig. 5 by the deflecting plates 4 at the frequency, $f_0$, for example, so as to impinge to a less extent on one section of the target and correspondingly more on the other and then vice versa. The amplitude is preferably less than sufficient to interrupt the beam on either target.

The beam forming and focussing elements comprise cathode 37 heated by filament 2 from battery 8, control electrode or grid 38 having central aperture, first anode or accelerating electrode 39 and second anode 41. About midway of tube 39 is a septum 40 having a square aperture for defining the cross-section of the beam.

The input waves which are to control the beam intensity are impressed on the control electrode by means of coupling 13, 9.

For purposes of modulating, the signal is impressed on the input 14 and the carrier is impressed on input 42. For demodulating, the incoming modulated waves may be impressed on input 14 with carrier on input 42 or the modulated waves can be impressed on input 42 with carrier on input 14.

Target 35 is connected to the upper terminal of output winding 44 while target 36 is connected to the lower terminal. The mid-point of winding 44 is connected to the positive pole of anode battery 17. If the collector 43 were not used, the beam in moving into increasing incidence upon target 35 would send increasing electron current to the upper terminal of coil 44, while at the same instant the decreasing incidence of the beam on target 36 would decrease electron flow to the lower terminal of this coil, both effects being cumulative in the secondary circuit through filter 46. Condenser 45 stores the rectified pulses representing demodulated speech, and delivers a smoothed speech signal. This condenser may be omitted in the case of a modulator.

Collector 43 is preferably used to secure increased output. It is polarized positive with respect to targets 35, 36 by the extra battery cells 47. When the beam is increasing on target 35 (for example) electrons are emitted in increasing number from 35 and in decreasing number from 36 and collected on 43. Thus, the direction of electron flow in the external circuit including winding 44 is opposite to that described above. When the tube is serving as a modulator, filter 46 may be a band-pass filter designed to pass one or both side-bands. When the tube is used as a demodulator filter 46 may be a speech frequency filter.

The tube of Fig. 5 is a single pass-band tube. When used as a modulator it produces side-bands based on the fundamental frequency of oscillation $f_0$ without production of harmonics of $f_0$. The frequency diagram for this tube is, therefore, of the type given in Fig. 6. It will be noted from Fig. 6 that there is no low frequency pass range for this case. In the earlier single target cases the speech applied to the beam at grid 5 produced output wave components of speech frequency, as indicated in the frequency diagrams of Figs. 2 and 4. The input speech or other wave at 13, 9 of Fig. 5 is, however, balanced out in the output and only the modulated products result.

Figure 8:
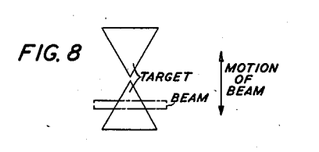

The structures described so far illustrate how beams with long thin cross-section or square cross-section can be produced and how tubes with single targets or with double (split) targets may be used. Figs. 7, 8 and 9 show by way of illustration other combinations using one or the other of these beam sections and single or double targets and their manner of construction and use follows clearly from the previously described figures. The character of output waves is indicated for each case by the corresponding diagram, Fig. 7A, Fig. 8A or Fig. 9A.

Typical uses for the tubes thus far described are in terminals of carrier channels. If the tube of Fig. 1, for example, has speech applied to circuit 14 through input filter 15, a succession of speech-modulated carrier waves is produced as in Fig. 2. All of these may be transmitted, if desired, or more usually output filter F would be designed to pass only one of the modulated waves, e. g., the two speech side-bands based upon frequency $2f_0$. Load 24 may in this case be considered a line or other transmitting channel. At the receiving end an exactly similar tube is used except that the filters 15 and F are interchanged and the incoming modulated wave is applied at 14 and the demodulated speech is produced in the tube output circuit 23. In this case, instead of interchanging filters F and 15, no filter need be used on the input side, and filter 15 may be simply removed and, if desired, may be used on the output side. Even in a multiplex system all of the received modulated waves may be impressed together on the input circuit 14 and the frequency of the wave from source 7 will determine which of the waves will be demodulated to yield speech in the output. A multiplex system is therefore possible using a demodulating tube like that of Fig. 1 in each receiving channel without channel separating filters in their inputs, the separation being effected by use of proper frequencies from the local source 7 for each tube. Each tube will then demodulate its proper modulated wave but no output products falling in the speech range will appear from the other modulated waves impressed.

Figure 8A:
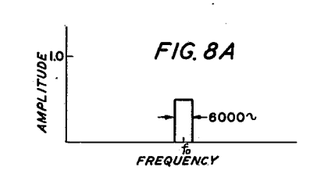
Figure 9:
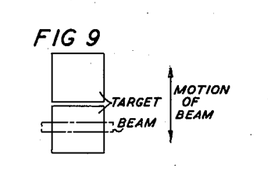
Figure 9A:
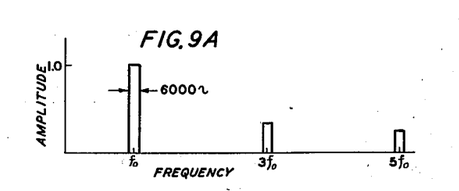

The tubes shown in Figs. 3 and 5 and tubes with the beams and targets indicated in Figs. 7, 8 and 9 may be similarly applied to carrier transmission and reception with similar results, except that in the case of the tubes whose frequency characteristic is of the type indicated in Fig. 4 or Fig. 7A or Fig. 8A only one modulation frequency range will be produced in the modulating process. With the Fig. 8A type characteristic there is also no direct speech transmission to line. No channel transmitting filter is needed in these cases since there are no modulation bands other than the wanted band. Where the tubes transmit direct speech (as in Fig. 4 or in Fig. 7A) it may be desirable to have a high-pass filter in the modulator output to suppress speech frequencies.

Figure 10:
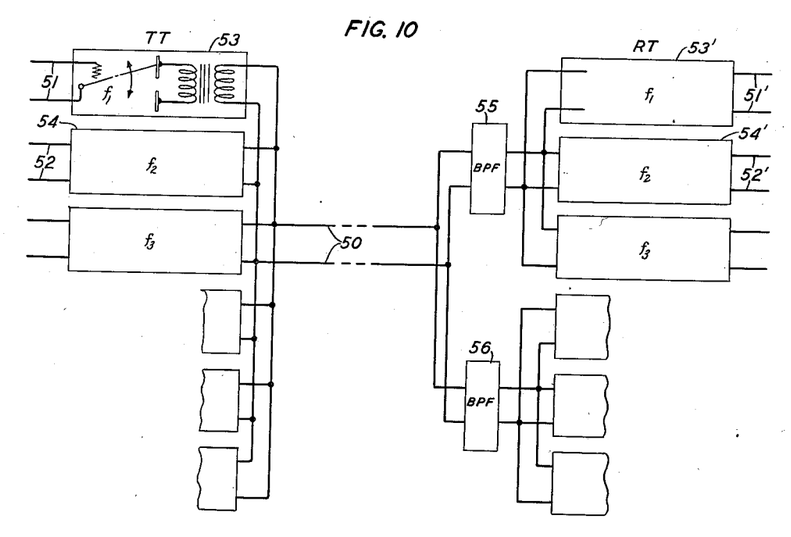
Fig. 10 is a simplified circuit diagram in block schematic of a multiplex carrier system in which the invention is embodied.

In Fig. 10 there is shown in outline a multiplex carrier system in accordance with this invention. The multiplex line (which could equally well be a radio link) is shown at 50 connecting a transmitting terminal TT at the left with a receiving terminal RT at the right. Low frequency lines, such as telephone lines 51, 52, etc., enter the terminal TT for communication with corresponding lines 51', 52', etc. at the terminal RT. At 53 there is indicated symbolically a tube with a split target and a beam oscillating at frequency $f_1$ and controlled by a grid in accordance with signals on line 51. This tube may be of the type shown in Fig. 5 with a target such as in Fig. 8, for example. A similar tube 54 is included in line 52 and in each of the other such lines, each tube using a different frequency of beam oscillation $f_2$, $f_3$, etc. Six lines are shown by way of example at terminal TT and it will be understood that each line is equipped similarly except that a different beam frequency is used in the case of each tube. At the terminal RT an exactly similar layout is used, as is indicated by the primed numerals except that the receiving channel branches are divided into two groups by band-pass filters 55 and 56.

One advantage of the use of filters 55 and 56 is in reducing cross-talk effects. Second order products from a given tube are of the form $$2(f_1+a)$$
$$2(f_1+b)$$
$$2(f_1+a+b)$$

and terms lower than $f_1$ where $f_1+a$ and $f_1+b$ are any two frequency components in a band having $f_1$ as its lower edge. It is apparent that all of these components lie outside of a band extending from $f_1$ to $2f_1$. If, therefore, the filters 55 and 56 each define a transmission band in which the highest frequency is twice the lowest, the second order cross-talk or modulation products will be largely suppressed. There is no significance to three as the number of channels in a group in Fig. 10. Any suitable but preferably small number of channels may be used to a group. By subdividing the total band transmitted over line 50 into smaller bands at the receiver by filters 55, 56 the reduction in cross-talk mentioned is secured.

Figure 11:
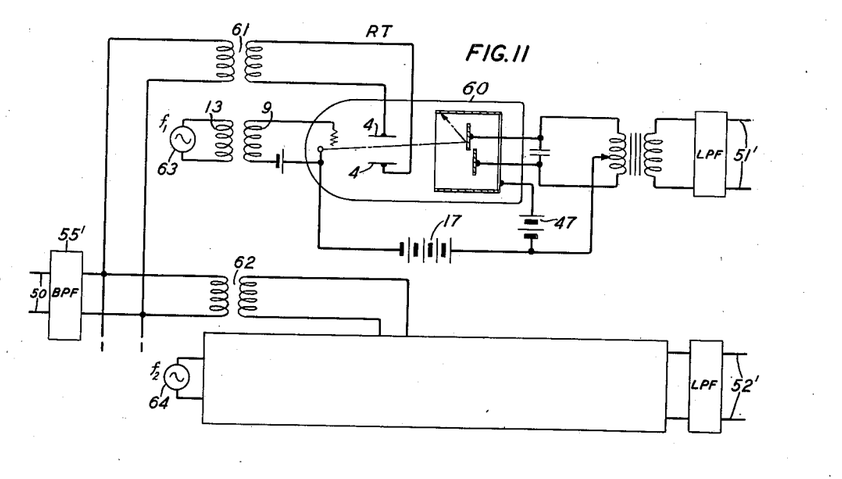
Fig. 11 shows an alternative type of carrier wave terminal circuit.

Another form of receiving circuit suitable for use at the terminal RT of Fig. 10 is shown in Fig. 11. This comprises a tube 60 in each channel, of the type shown in Fig. 5. The incoming modulated waves from line 50 pass through one of the band-pass filters 55' (if used) and through input coils 61, 62, etc. to the sweep plates 4 of each tube 60. The grid is connected to an individual generator 63, 64, etc. of the respective carrier frequency $f_1$, $f_2$, etc. Each tube operates to demodulate the wave whose carrier corresponds to the local wave frequency, and no other. With this method of reception there is very little tendency for the various received waves to intermodulate in any tube and correspondingly little chance of cross-talk.

It is known that a grid in controlling a discharge current has a tendency of introducing non-linear effects. Grid control with its attendant distorting tendency is eliminated in the alternative type of construction shown in Fig. 12, in which the input signal is applied to one pair of deflecting plates and the carrier for modulating or demodulating purposes is applied to another pair of deflecting plates at right angles to the first pair.

Figure 12:
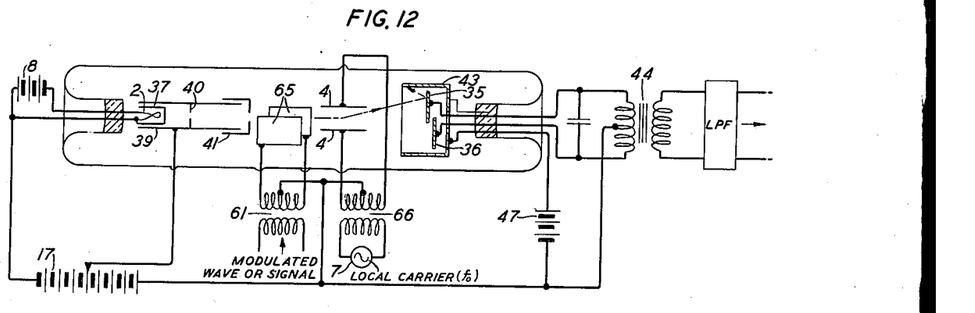
Fig. 12 is a view, generally similar to Figs. 1 and 5, of a further tube construction and circuit according to the invention.
Figure 12A:
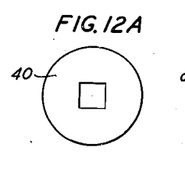
Figs. 12A, 12B, 13 and 14 show details in connection with Fig. 12.

The tube is of the general construction shown in Fig. 5 but omits the grid and includes the second pair of sweep plates 65 to which the signal or modulated wave is applied. These are applied from the line or any suitable circuit, through transformer 61. The polarizing voltage for both sets of plates is applied by suitable connection to the mid-points of the secondaries of the transformers 61 and 66 as shown.

Figure 12B:
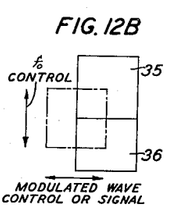

In the operation of this form of tube the beam which may be square in cross-section is half on and half off the targets when there is no signal, as shown in Fig. 12B. This beam is oscillated in the vertical direction at the carrier frequency by the plates 4 under control of the wave $f_0$ from generator 7. When signal waves are applied to sweep plates 65 the beam is moved in the horizontal direction so that more or less than half of it strikes the targets, depending upon the direction of the signal variations. The device can serve as a modulator or demodulator. It may be substituted in the system shown in Fig. 10 by connecting the input signal branches to the sweep plates 65 instead of to the grids of the tubes in that figure. In this respect the input and output connections to the signaling circuits would be as shown in the Fig. 11 modification.

Figure 13:
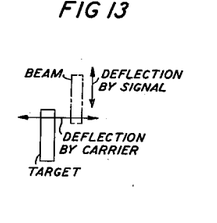
Figure 14:
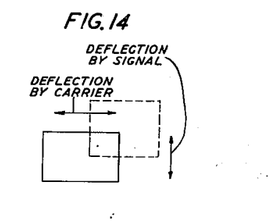

This type of control may also be used with various other shapes of target and beam than those shown in Fig. 12. Two such other shapes are illustrated in Figs. 13 and 14 which are self-explanatory. In Fig. 13 the type of output wave would be that shown in Fig. 2, while in the case of Fig. 14 the type of output wave would be that shown in Fig. 7A.

Figures 15, 16, 16A:
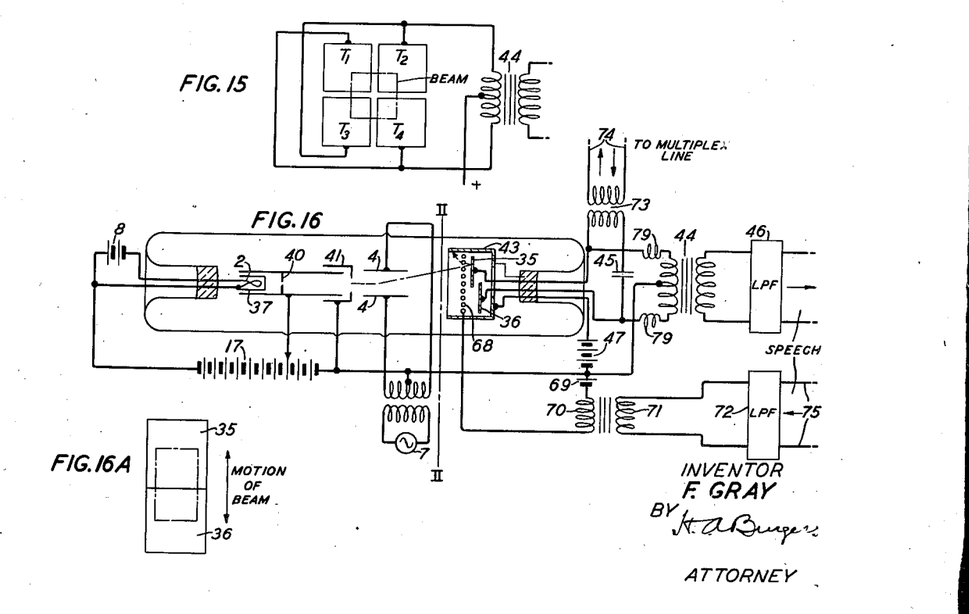
Fig. 15 shows an alternative target construction.
Fig. 16 is a view generally similar to Figs. 1, 5 and 12 of an alternative tube construction and circuit according to the invention.
Fig. 16A shows the plan of the target and beam section.

Another form of particular interest is shown in Fig. 15. Here the target is divided into four squares $T_1$, $T_2$, $T_3$ and $T_4$ and the beam is square in cross-section and in the absence of any deflecting forces it occupies a central position such that it impinges equally on all four target portions. It is swung in one plane, say horizontally, by the local source 7 and in the vertical direction by the signal or modulated wave. It will be observed that if only the locally generated wave is active, there is no output; in other words, this form of construction suppresses the unmodulated carrier. As the beam swings to the right or left only, no resultant change in potential is produced across the terminals of output coil 44. The same is true of vertical motion alone. When both carrier and control waves are effective the modulated component produced on each target section is proportional to the instantaneous product of the two waves. Consider the instant when the carrier wave is moving the beam to the left and the signal is moving the beam upwards. Taking as positive the direction of increasing incidence on a quarter target by either of the two waves and as negative the opposite direction, the product effect on $T_1$ is positive, that on $T_2$ is negative, that on $T_3$ is negative and that on $T_4$ is positive. $T_2$ and $T_3$ both produce a negative effect while $T_1$ and $T_4$ both produce a positive effect. These effects are, therefore, cumulative on the output. If modulated waves and local carrier of proper phase and frequency are the two waves, it is obvious that rectification and, consequently, demodulation take place. It can be seen by inspection that if carrier and low frequency waves such as speech are the two input waves, the carrier output is proportional to the speech and two side-bands are produced without the unmodulated carrier wave component.

All of the devices that have been shown and described thus far are one-way devices. Fig. 16 shows a two-way construction which is capable of modulating a carrier wave by speech for transmission and of demodulating received modulated waves for purposes of speech reception. The tube of Fig. 16 is similar in general construction to that shown in Fig. 5 as will be seen from the use of similar reference characters. The tube, however, has been modified at the right-hand or target end to permit two-way operation. A controlling grid 68 is inserted just ahead of the half-targets 35 and 36. This grid is connected to one terminal of speech coil winding 70, the other terminal of which is connected through battery 69 to the positive pole of battery 17 and to the mid-point of winding 44. The other winding 71 of the speech transformer is connected to any suitable speech input circuit 75 which is shown as including low-pass filter 72 passing speech frequencies.

The output circuit for received speech is as in the previous figure through output winding 44 and speech filter 46. High frequency choke coils 79, 79 pass speech frequencies readily but oppose passage of carrier frequencies. The high frequency termination for connection to the multiplex carrier line or system is shown at 74. It is coupled through high frequency transformer 73 in series with tuning condenser 45 across the half-targets 35 and 36. The carrier wave source is shown at 7 as in the previous cases.

In the operation of this device for modulating the carrier wave by speech for transmission purposes the speech is received from circuit 75 through speech filter 72 and speech input transformer 70, 71 by which the speech variations are impressed between the mid-point of coil 44 and the control grid 68. As the beam is oscillated under control of carrier waves from source 7 secondary electrons are emitted as previously described from the targets 35 and 36 to the collector 43 and produce corresponding current changes in the output circuit. The secondary electrons emitted from the targets 35 and 36 have relatively low velocity and the number of such electrons passing over to the collector 43 can be readily controlled by the use of a rather coarse mesh grid at 68 which interposes very slight obstruction to the beam in its passage toward the targets. Speech potential variations on the grid 68 control the strength of the secondarily emitted electron current and thus modulate the carrier wave passing into the output circuit through coil 73 and condenser 45. In this way a modulated carrier wave is transmitted into circuit 74 and to the multiplex line. When modulated carrier waves are received from the multiplex line through circuit 74 and transformer 73 they have the effect of varying the potential of either target 35 or 36 with respect to the grid 68 since the grid 68 has its potential fixed by the connection to the mid-point of winding 44. These high frequency variations of potential difference between half-targets 35 and 36 and grid 68 control the strength of the secondarily emitted electrons from the half-targets to the collector 43 and thus vary the rectified or demodulated current in the output through winding 44 and permit speech to be received in the secondary circuit including filter 46. The preferred form of beam cross-section and shape of target is indicated in Fig. 16A, although it will be apparent that various other forms may be used.

Figure 17:
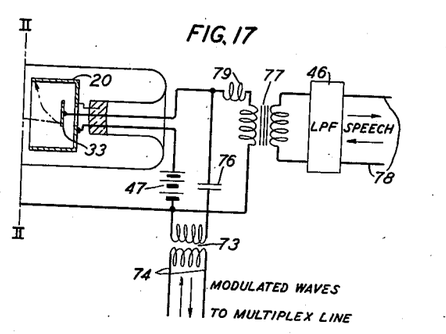
Fig. 17 shows a modified tube construction and circuit which may replace the part of Fig. 16 to the right of broken line II—II.
Figure 17A:
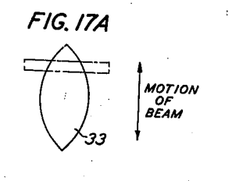
Fig. 17A shows shapes of target and beam section for the Fig. 17 construction.

A two-way operation may be obtained without the use of a grid such as 68 of Fig. 16. Fig. 17, for example, shows a tube of the type shown in Fig. 1 modified in its right-hand portion by a substitution of the construction shown in Fig. 17 for that shown in Fig. 1 to the right of the line I—I. In Fig. 17 the speech circuit 78 is a two-way circuit such as an ordinary telephone line leading to a subscriber's station or central office and including the speech filter 46. When speech is received from circuit 78 through the speech coil 77 it has the effect of changing the potential of the target 33 with respect to the collector 20 at speech frequencies. These changes in potential affect the rate of passage of secondarily emitted electrons over to the collector 20 and thus modulate the carrier frequency wave in the output. It will be understood that the beam is oscillating at a carrier frequency under control of the source 7, Fig. 1. The resulting modulated carrier wave passes through the branch including condenser 76 and winding 73 so that the modulated waves are impressed on branch 74 leading to the multiplex line. Modulated carrier waves received from the multiplex line in circuit 74 are impressed across the circuit between the target 33 and collector 20 and vary the difference of potential effective in attracting secondary electrons to the collector 20. This results in combining the effect of the local source of carrier waves with the received modulated waves in such a manner as to demodulate the received waves and produce speech currents in the speech circuit 78. High frequency retardation coil 79 is included in the branch leading to the speech transformer 77 to prevent shunting of the high frequency currents through the shunt capacity of the coil 77.

It is understood that in Figs. 16 and 17 the necessary frequency and phase relations are obtained between the incoming modulated waves and the waves from the local source 7 to secure maximum effects.

It will be noted that in the structures shown in Figs. 16 and 17 the production of the secondary electrons is controlled by the beam and the number of secondary electrons utilized to produce output current is controlled by varying the potential difference between the secondary electron emitter and an adjacent electrode.

Figure 18:
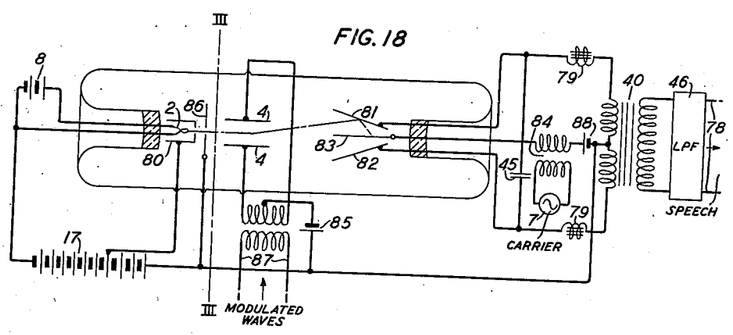
Fig. 18 shows an alternative type of tube construction and circuit according to the invention.

Another construction operating on this principle is shown in Fig. 18. A ribbon-like beam of electrons is drawn from filament 2 by first anode 80 containing a slit and is partially focused on the split target 81, 82. The beam has a uniform distribution of electrons over its cross-section. Since it is only partially focussed it has an appreciable thickness. Secondary electrons are driven out of targets 81 and 82 and attracted over to the collector 83, which has a small positive potential with respect to the targets, impressed from battery 88. Sweep plates 4 have a small negative bias applied to them with respect to second anode 86 to suppress any stray secondary electrons coming from 86.

In operating as a demodulator, the tube may have the incoming modulated waves impressed on circuit 87 leading to the sweep plates 4 and the carrier by which the waves are to be demodulated is applied through transformer 84 to the collector 83. The rectified pulses are temporarily stored in condenser 45 and the demodulated speech or signal passes through the choke coils 79 and repeating coil 40 to the outgoing line 78.

Figure 19:
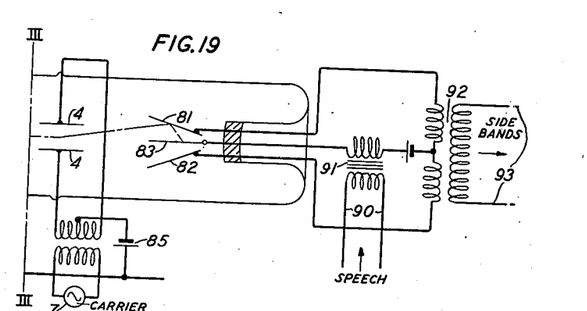
Fig. 19 shows a modification of the portion of the Fig. 18 construction to the right of broken line III—III.

An analogous modulating circuit is shown in Fig. 19. The carrier is applied to the sweep plates 4 from carrier source 7, and the speech is applied through circuit 90 and repeating coil 91 to the collector 83. The resulting side-bands are transmitted through transformer 92 to outgoing line or circuit 93.

It will be obvious to vary the manner of association of the carrier and the speech or side-band waves with the tube, to enable the tube to act as modulator or demodulator. The carrier in Fig. 18 may be coupled through individual couplings to the targets instead of through the mid-branch and the same is true of the speech in Fig. 19.

Figure 20:
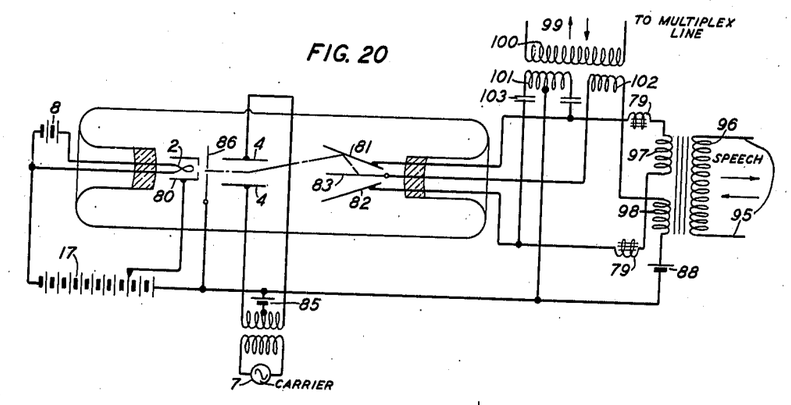
Fig. 20 is a view, generally similar to Fig. 18, of a modified circuit according to the invention.

A two-way modulator-demodulator using the same type of tube and suitable for use as a two-way carrier terminal is shown in Fig. 20. The speech circuit 95 is connected across the targets by means of repeating coil windings 96 and 97 of the repeating coil and is connected in circuit with the collector 83 by means of windings 96 and 98 of this coil. In similar manner the carrier circuit 99 is coupled by way of high frequency transformer windings 100, 101 across the targets and by means of windings 100, 102 in circuit with the collector 83. The carrier waves are applied to the sweep plates 4, 4.

For transmitting, speech from circuit 95 is impressed by windings 96 and 98 on the collector 83. The speech modulates the carrier frequency current as the beam oscillates between 81 and 82. The modulated wave is set up across the targets and applied to winding 101 and repeated into line 99. There is also direct transmission of speech but this can be suppressed, if desired, by the usual high-pass filter in line 99 commonly used in carrier systems.

Incoming modulated waves from circuit 99 appear across windings 101 and 102. The voltage induced in winding 101 has a symmetrical relation to the targets and does not result in demodulation. The voltage in winding 102 undergoes rectification in cooperation with the beam oscillations and produces demodulated speech across the targets and this is transmitted through windings 97 and 96 into circuit 95. Small condensers 103 in the leads from winding 101 prevent the shunting of demodulated speech through this winding. For maximum output the locally supplied carrier waves have frequency and phase agreement with the unmodulated carrier component on which the received side-bands are based.

Figure 21:
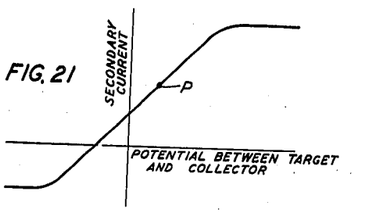
Fig. 21 gives the characteristic of a tube using secondary emission.

The relation between secondary current from a target and voltage difference between the target and collector is of the form shown in Fig. 21. The bias applied to the collector from battery 88 is such as to cause operation about the point P, about mid-way of the straight portion of the characteristic.

Figure 22:
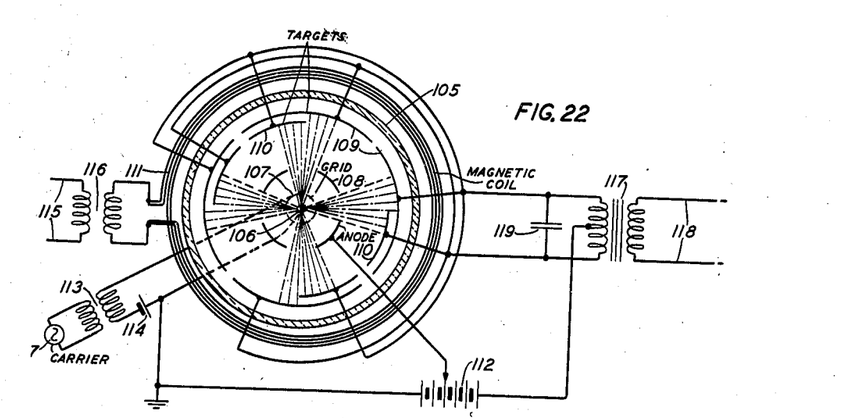
Fig. 22 is a plan view diagram of a tube using radial beams with magnetic deflecting coil.

In Fig. 22 the tube is shown as of cylindrical form with its axis perpendicular to the plane of the paper. It comprises a glass envelope 105 having at its axis a cathode 106 in the form of a straight filament or a small cylindrical cathode indirectly heated in known manner. Surrounding the cathode in the order named are a spiral grid 107, a segmented anode 108 divided into quadrants, and a circular row of pairs of targets 109 and 110. The four beams are wedge-shaped and are brought to this shape by the described electrode assembly and applied potentials. The spiral grid is biased negatively by battery 114. The targets receive positive voltage from battery 112 and the anodes 108 receive intermediate positive voltage from a tap connection on battery 112.

The tube is surrounded by a coil 111 coaxial with the tube and of the same axial length as the tube electrodes or substantially so. The terminals of the coil are connected to a transformer 116 coupling the coil to a circuit 115 carrying modulated waves to be demodulated by the tube. For this purpose a source of carrier waves 7 is coupled between the cathode and grid through coupling 113.

Alternate targets 109 are connected together and to one terminal of outgoing speech or signal coil 117 and alternate targets 110 are connected together and to one terminal of this coil, the targets constituting a pair being connected to opposite terminals of this coil leading to speech circuit 118.

The number of beams is not restricted to four. Any suitable number may be used together with a corresponding number of pairs of targets. The targets of a pair are shown overlapped to avoid a space that would be required to separate them if they were equidistant radially from the cathode.

It will be observed that the behavior of this tube is essentially similar to that of Fig. 5, omitting the collector 43. It uses a plurality of beams, however, in place of the single beam of Fig. 5.

The intensity of the beams is varied at carrier frequency by the grid 107. The beams are made to sweep over the pairs of targets at the frequency of the input modulated waves from circuit 105 by the magnetic field set up by coil 111. The beams are periodically curved clockwise and counter-clockwise in the figure so as to divide the beam incidence on the targets of a pair in varying proportions. The arrangement of the targets is such that the effects of inequalities in the radii of the targets is balanced out by alternating the connections to the inner and outer targets.

In the absence of input modulated waves, the carrier produces ideally zero output since it merely varies the beam intensity and the beams are equally divided relative to each pair of targets. As the beam is swept along the targets by an input modulated wave, rectification takes place, the rectified impulses are momentarily stored in the condenser 119 and the demodulated speech or other signal passes into outgoing circuit 118.

While various illustrative embodiments have been set forth in the interest of a full and complete disclosure of the invention, various modifications will naturally occur to workers skilled in the art, and it is to be understood that the invention is not to be considered as limited to the particular embodiments shown and described herein but that its scope is defined by the claims.

What is claimed is:

1. In electron discharge apparatus, beam forming electrodes, a two-part target in the path of the beam, means to sweep the beam over said target to shift the beam off from one part onto the other part and vice versa, at a sustained high frequency, means to vary the strength of the beam incident upon said target at a low frequency, each part of the target being so shaped that when the beam is wholly incident upon one part of the target the output current is instantaneously proportional to the displacement of the beam from its central position, whereby a modulated wave is produced.

2. In electron discharge apparatus, beam forming electrodes, a two-part target in the path of the beam, means to sweep the beam over said target to shift the beam off from one part onto the other part and vice versa, at a sustained high frequency, means to vary the strength of the beam incident upon said target in accordance with an input signal modulated wave of the same carrier frequency as said sustained high frequency, each part of the target increasing in a lateral dimension with distance from the center of the target whereby the area of beam intercepted by the target increases with displacement of the beam from its central position, whereby demodulation of the input signal modulated wave takes place.

3. In space discharge apparatus, a cathode and an anode structure enclosed in an envelope, means to produce a discharge stream across the intervening space, means to oscillate said stream across said anode structure at a high frequency, and means to control the anode current in accordance with low frequency variations, said anode structure being tapered and presenting to the stream an effective area which at any one position is a function of the displacement of the stream from normal, and said function satisfying the requirement that only two complementary side-bands of a single high frequency modulated wave are produced.

4. A combination according to claim 3 in which said anode structure comprises two wedge-shaped members pointing toward each other in a plane normal to the stream.

FRANK GRAY.